United States Patent
Lott et al.

(10) Patent No.: US 8,989,041 B2
(45) Date of Patent: Mar. 24, 2015

(54) APPARATUS AND METHOD FOR CONTROLLING AN ACCESS PROBE TRANSMIT POWER ACCORDING TO A REVERSE LINK UNDERLOAD CONDITION

(71) Applicant: Qualcomm Incorporated, San Diego, CA (US)

(72) Inventors: Christopher Gerard Lott, San Diego, CA (US); Jing Sun, San Diego, CA (US); Rashid Ahmed Akbar Attar, San Diego, CA (US); Linhai He, San Diego, CA (US); Ravindra Manohar Patwardhan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 13/747,598

(22) Filed: Jan. 23, 2013

(65) Prior Publication Data
US 2013/0301437 A1 Nov. 14, 2013

Related U.S. Application Data

(60) Provisional application No. 61/646,871, filed on May 14, 2012.

(51) Int. Cl.
*H04W 24/10* (2009.01)
*H04W 52/50* (2009.01)
*H04W 52/24* (2009.01)
*H04W 52/34* (2009.01)
*H04W 48/12* (2009.01)
*H04W 74/08* (2009.01)

(52) U.S. Cl.
CPC ............ *H04W 24/10* (2013.01); *H04W 52/243* (2013.01); *H04W 52/343* (2013.01); *H04W 52/50* (2013.01); *H04W 48/12* (2013.01); *H04W 74/08* (2013.01); *Y02B 60/50* (2013.01)
USPC ........................................................ 370/252

(58) Field of Classification Search
None
See application file for complete search history.

(56) References Cited

U.S. PATENT DOCUMENTS 6,496,531 B1 12/2002 Kamel et al.
7,738,903 B2 6/2010 Chen et al.
(Continued)

OTHER PUBLICATIONS

International Search Report and Written Opinion—PCT/US2013/040993—ISA/EPO—Jul. 8, 2013.
(Continued)

*Primary Examiner* — Anh-Vu Ly
(74) *Attorney, Agent, or Firm* — QUALCOMM IP Department; James Hunt Yancey, Jr.

(57) ABSTRACT

Apparatus and methods are disclosed for adapting the power of an access probe transmission, in accordance with a reverse link underload indicator provided by the base station. In one example, the base station can transmit a one-bit reverse link underload indicator as an information element broadcasted within a general page message (GPM). Here, the reverse link underload indicator can indicate whether a measured rise-over-thermal (RoT) at the base station is less than a given threshold. The access terminal may accordingly reduce the initial transmit power of an access probe transmission in the case of a reverse link underload condition, as this condition would indicate that the base station could accommodate reduced power access probe transmissions without substantially decreasing the probability of a quick detection of the access attempt. Other aspects, embodiments, and features are also claimed and described.

20 Claims, 7 Drawing Sheets

(56) References Cited

U.S. PATENT DOCUMENTS

| | | | |
|---|---|---|---|
| 7,860,052 B2* | 12/2010 | Lohr et al. ............... | 370/329 |
| 7,983,172 B2 | 7/2011 | Zhu et al. | |
| 8,014,805 B2 | 9/2011 | Willenegger et al. | |
| 8,498,657 B1* | 7/2013 | Delker et al. ............. | 455/466 |
| 8,559,325 B2* | 10/2013 | Damnjanovic et al. ..... | 370/252 |
| 2004/0162101 A1 | 8/2004 | Kim et al. | |
| 2007/0177556 A1 | 8/2007 | Chen | |
| 2007/0201405 A1* | 8/2007 | Santhanam ............... | 370/335 |
| 2010/0034177 A1 | 2/2010 | Santhanam | |
| 2010/0041430 A1* | 2/2010 | Ishii et al. ............... | 455/522 |
| 2010/0202317 A1 | 8/2010 | Proctor, Jr. | |
| 2011/0222455 A1* | 9/2011 | Hou et al. ............... | 370/311 |
| 2011/0275331 A1* | 11/2011 | Wang et al. ............. | 455/73 |
| 2011/0294530 A1* | 12/2011 | Malladi et al. ........... | 455/509 |
| 2011/0319088 A1* | 12/2011 | Zhou et al. ............. | 455/442 |
| 2014/0161073 A1* | 6/2014 | Zhou et al. ............. | 370/329 |

OTHER PUBLICATIONS

Taiwan Search Report—TW102117069—TIPO—Oct. 1, 2014.

* cited by examiner

APPARATUS AND METHOD FOR CONTROLLING AN ACCESS PROBE TRANSMIT POWER ACCORDING TO A REVERSE LINK UNDERLOAD CONDITION

CROSS-REFERENCE TO RELATED APPLICATION & PRIORITY CLAIM

This application claims priority to and the benefit of provisional patent application No. 61/646,871, titled "Using Reverse Link Underload Indicator to Improve Access Probe Power Selection" and filed in the United States Patent and Trademark Office on May 14, 2012, the entire content of which is incorporated herein by reference as if fully set forth below and for all applicable purposes.

TECHNICAL FIELD

The technology discussed in this patent application relates generally to wireless communication, and more specifically, to access channel transmissions for initiating communication sessions in wireless communication systems. Embodiments of the present invention enable efficient use of power resources as well as enabling low network interference helpful in overall network communications.

BACKGROUND

Wireless communications systems are widely deployed to provide various types of communication content such as voice, video, packet data, messaging, broadcast, and so on. These systems may be accessed by various types of access terminals adapted to facilitate wireless communications, where multiple access terminals share the available system resources (e.g., time, frequency, and power).

In any wireless communication system, power consumption at the battery-powered mobile device is one of the most important characteristics for improving user experience, and substantial resources continue to be deployed in the art to reduce power consumption and increase usable life of the mobile devices. For example, because power amplifiers and associated circuitry are relatively energy intensive components of a mobile device, optimization of radio usage can be one of the most fruitful efforts in terms of addressing power consumption issues and network interference.

BRIEF SUMMARY OF SOME EXAMPLE EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in one aspect, the disclosure provides a method of wireless communication operable at a base station. A method can include determining whether a rise-over-thermal (RoT) corresponding to interference at the base station is less than a predetermined threshold, and transmitting an information element corresponding to the determined RoT. The information element can comprise a value (e.g., one or more bits) configured to indicate whether the RoT is less than the predetermined threshold.

In another aspect, the disclosure provides a method of wireless communication operable at an access terminal. A method can include receiving an indication of at least one of interference or loading at a base station, determining an access probe transmission power based at least in part on the received indication, and transmitting an access probe at the determined access probe transmission power.

In another aspect, the disclosure provides a base station configured for wireless communication. A base station can include means for determining whether a rise-over-thermal (RoT) corresponding to interference at the base station is less than a predetermined threshold, and means for transmitting an information element corresponding to the determined RoT. The information element can comprise of a value (e.g., one or more bits) configured to indicate whether the RoT is less than the predetermined threshold.

In another aspect, the disclosure provides an access terminal configured for wireless communication. An access terminal can include means for receiving an indication of at least one of interference or loading at a base station, means for determining an access probe transmission power based at least in part on the received indication, and means for transmitting an access probe at the determined access probe transmission power.

In another aspect, the disclosure provides a base station configured for wireless communication. A base station can include at least one processor, a communications interface communicatively coupled to the at least one processor, and a memory communicatively coupled to the at least one processor. The at least one processor is configured to determine whether a rise-over-thermal (RoT) corresponding to interference at the base station is less than a predetermined threshold, and control transmissions, via the communications interface, of an information element corresponding to the determined RoT. The information element can comprise a value (e.g., one or more bits) configured to indicate whether the RoT is less than the predetermined threshold.

In another aspect, the disclosure provides an access terminal configured for wireless communication. The access terminal can include at least one processor, a communications interface communicatively coupled to the at least one processor, and a memory communicatively coupled to the at least one processor. The at least one processor is configured to receive an indication of at least one of interference or loading at a base station, to determine an access probe transmission power based at least in part on the received indication, and to control transmissions, via the communications interface, an access probe at the determined access probe transmission power.

In another aspect, the disclosure provides a computer-readable storage medium. A medium can include or store instructions that, when executed by a computer operable at a base station, cause the computer (e.g., a controller or processor) to determine whether a rise-over-thermal (RoT) corresponding to interference at the base station is less than a predetermined threshold, and to transmit an information element corresponding to the determined RoT, wherein the information element comprises one bit configured to indicate whether the RoT is less than the predetermined threshold.

In another aspect, the disclosure provides a computer-readable storage medium. A medium can include instructions that, when executed by a computer operable at an access terminal, cause the computer to receive an indication of at least one of interference or loading at a base station, to determine an access probe transmission power based at least in part on the received indication, and to transmit an access probe at the determined access probe transmission power.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of wireless communication systems, network architectures, and communication standards. Certain aspects of the discussions are described below for CDMA and 3rd Generation Partnership Project 2 (3GPP2) 1x protocols and systems, and related terminology may be found in much of the following description. However, those of ordinary skill in the art will recognize that one or more aspects of the present disclosure may be employed and included in one or more other wireless communication protocols and systems.

Figure 1:
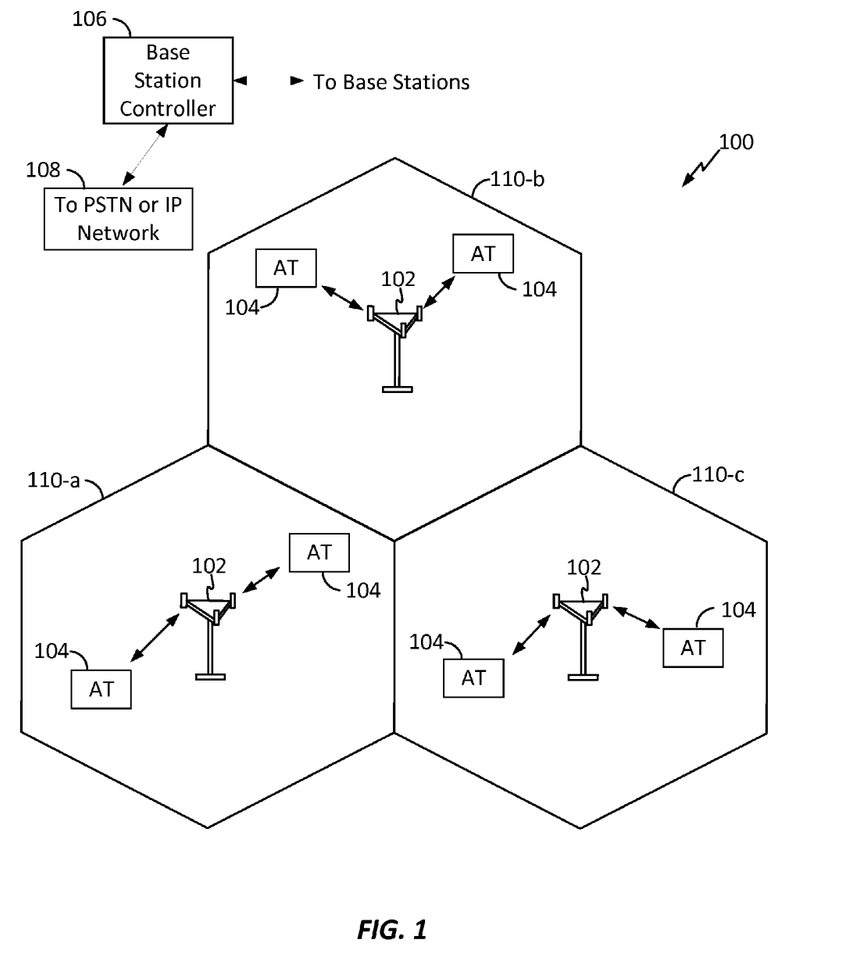
FIG. 1 is a block diagram illustrating an example of an access network in which one or more aspects of the present disclosure may find application.

FIG. 1 is a block diagram illustrating an example of a network environment in which one or more aspects of the present disclosure may find application. The wireless communication system 100 generally includes one or more base stations 102, one or more access terminals 104, one or more base station controllers (BSC) 106, and a core network 108 providing access to a public switched telephone network (PSTN) (e.g., via a mobile switching center/visitor location register (MSC/VLR)) and/or to an IP network (e.g., via a packet data switching node (PDSN)).

The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. A base station 102 may also be referred to by those skilled in the art as an access point, a base transceiver station (BTS), a radio base station, a radio transceiver, a transceiver function, a basic service set (BSS), an extended service set (ESS), a Node B, a femto cell, a pico cell, and/or some other suitable terminology.

The base stations 102 are configured to communicate with the access terminals 104 under the control of the base station controller 106 via multiple carriers. Each of the base stations 102 can provide communication coverage for a respective geographic area. The coverage area 110 for each base station 102 here is identified as cells 110-*a*, 110-*b*, or 110-*c*. The coverage area 110 for a base station 102 may be divided into sectors (not shown, but making up only a portion of the coverage area). In a coverage area 110 that is divided into sectors, the multiple sectors within a coverage area 110 can be formed by groups of antennas with each antenna responsible for communication with one or more access terminals 104 in a portion of the cell.

One or more access terminals 104 may be dispersed throughout the coverage areas 110, and may wirelessly communicate with one or more sectors associated with each respective base station 102. An access terminal 104 may generally include one or more devices that communicate with one or more other devices through wireless signals. Such access terminals 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. The access terminals 104 may include mobile terminals and/or at least substantially fixed terminals. Examples of access terminals 104 include mobile phones, smart phones, entertainment devices, metering devices, pagers, wireless modems, personal digital assistants, personal information managers (PIMs), personal media players, palmtop computers, laptop computers, tablet computers, televisions, appliances, e-readers, digital video recorders (DVRs), machine-to-machine (M2M) devices, and/or other communication/computing devices which communicate, at least partially, through a wireless or cellular network.

Figure 2:
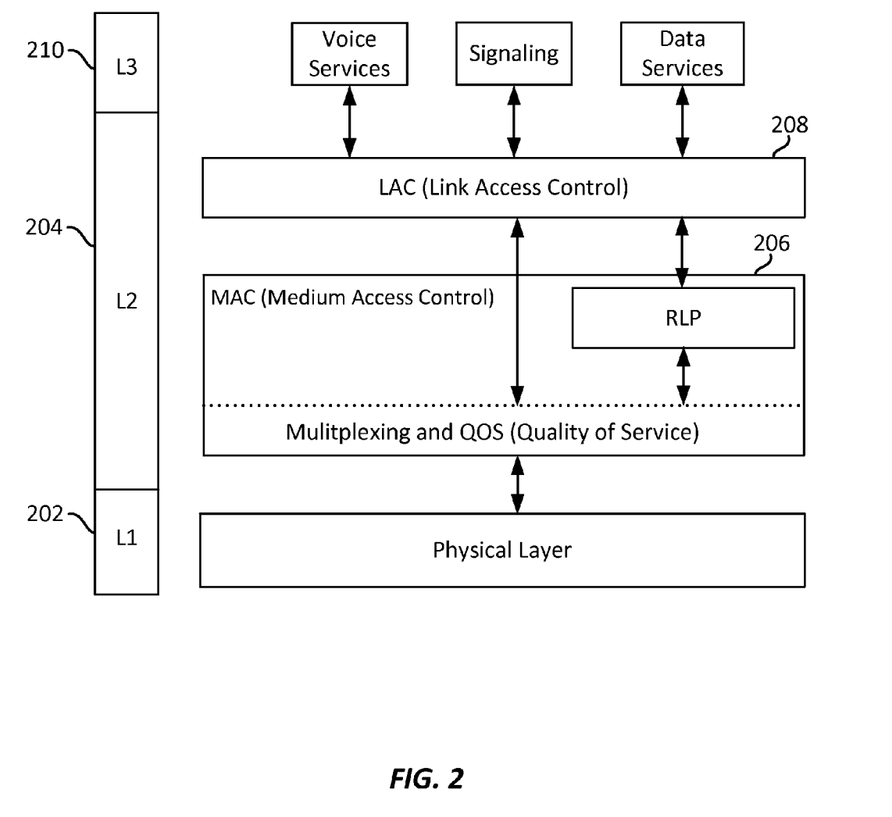
FIG. 2 is a block diagram illustrating an example of a protocol stack architecture which may be implemented by an access terminal according to some embodiments.

The access terminal 104 may be adapted to employ a protocol stack architecture for communicating data between the access terminal 104 and one or more network nodes of the wireless communication system 100 (e.g., the base station 102). A protocol stack generally includes a conceptual model of the layered architecture for communication protocols in which layers are represented in order of their numeric designation, where transferred data is processed sequentially by each layer, in the order of their representation. Graphically, the "stack" is typically shown vertically, with the layer having the lowest numeric designation at the base. FIG. 2 is a block diagram illustrating an example of a protocol stack architecture which may be implemented by an access terminal 104. Referring to FIGS. 1 and 2, the protocol stack architecture for the access terminal 104 is shown to generally include three layers: Layer 1 (L1), Layer 2 (L2), and Layer 3 (L3).

Layer 1 202 is the lowest layer and implements various physical layer signal processing functions. Layer 1 202 is also referred to herein as the physical layer 202. The physical layer 202 provides for the transmission and reception of radio signals between the access terminal 104 and a base station 102.

The data link layer, called layer 2 (or "the L2 layer") 204 is above the physical layer 202 and is responsible for delivery of signaling messages generated by Layer 3. The L2 layer 204 makes use of services provided by the physical layer 202. The L2 layer 204 may include two sublayers: the Medium Access Control (MAC) sublayer 206, and the Link Access Control (LAC) sublayer 208.

The MAC sublayer 206 is the lower sublayer of the L2 layer 204. The MAC sublayer 206 implements the medium access protocol and is responsible for transport of higher layers' protocol data units using the services provided by the physical layer 202. The MAC sublayer 206 may manage the access of data from the higher layers to the shared air interface.

The LAC sublayer 208 is the upper sublayer of the L2 layer 204. The LAC sublayer 208 implements a data link protocol that provides for the correct transport and delivery of signaling messages generated at the layer 3. The LAC sublayer makes use of the services provided by the lower layers (e.g., layer 1 and the MAC sublayer).

Layer 3 210, which may also be referred to as the upper layer or the L3 layer, originates and terminates signaling messages according to the semantics and timing of the communication protocol between a base station 102 and the access terminal 104. The L3 layer 210 makes use of the services provided by the L2 layer. Information (both data and voice) message are also passed through the L3 layer 210.

When the access terminal 104 wishes to initiate contact (e.g., a data/voice call or page response) with a network, it undertakes a process that is frequently called an access attempt or access process. In doing so, the access terminal 104 can transmit access probes on an access channel (e.g., the reverse link access channel R-ACH or the reverse link enhanced access channel R-EACH) at increasing power levels until a response is received from the base station 102. Here, an access probe may include a preamble, including a pilot channel transmission, and a capsule, including a data channel transmission. The data channel transmission within an access probe includes a suitable access payload, indicating information such as which base station 102 the access terminal 104 is targeting for call establishment.

Figure 3:
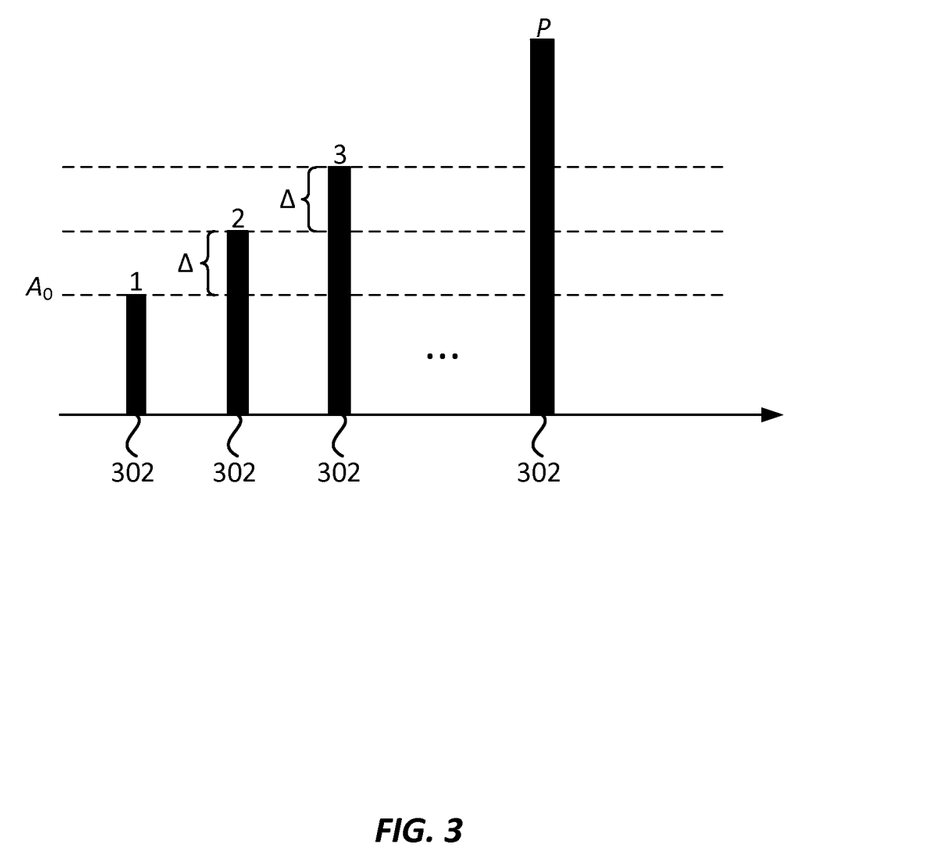
FIG. 3 is a schematic diagram illustrating an access sequence according to some embodiments.

FIG. 3 is a diagram illustrating an access probe sequence. Some embodiments can implement this sequence. In this sample scenario, access probes 302 are transmitted utilizing a suitable access sequence, with an initial, relatively low access probe transmit power $A_0$. If an acknowledgment is not received from the base station 102, the transmit power of the access probes 302 may be incremented by an amount Δ and retransmitted. This process can be repeated until P access probes are transmitted or a response is received from the base station 102, whichever comes first. This approach is mainly designed to make sure the access probes 302 are not transmitted at unnecessarily high power (to avoid interference), yet with high probability a successful access is achieved.

That is, when the access terminal 104 transmits access probes 302 to initiate a connection, it has to transmit those access probes 302 at a suitable power level. If the power is too low, the access probe 302 will not be detected at the base station 102. On the other hand, if the power is too high, it will create too much interference for nearby base stations, including the base station 102 the access probe 302 is targeting. Therefore, the access process not only needs to send an access payload to the base station 102, it can determine an appropriate transmit power level for the transmission. While the incremental increase of access probe transmit power, as described above and illustrated in FIG. 3, helps to achieve a balance, appropriate selection the initial access probe transmit power $A_0$ can effectively improve all aspects of the access attempt, including shortening the duration of the access attempt and reducing unwanted interference to neighboring base stations. Once the response from the base station 102 is received, the determined power level is utilized as a starting point for the transmit power level when a connection is established.

The initial transmit power $A_0$ for an access sequence is typically decided from a measurement of the power of forward link transmissions received at the access terminal 104 from the base station 102. If the measured forward link received power is high, that usually implies the access terminal 104 is in relatively close proximity to the base station 102, and therefore, a lower first access probe power $A_0$ may be used. When the measured forward link received power is low, this usually implies the access terminal 104 is relatively far away from the base station 102, and therefore, a higher first access probe power $A_0$ may be used.

At the base station 102, access probe transmit power is not the only factor that may affect the detection of the access probes 302. Other factors include path loss, channel characteristics, interference level at the base station 102, and others. Typically, many of these factors are not under control and are dynamic. Accordingly, there is no known way to accurately set the access probe transmit power in such a way to guarantee detection performance. Nevertheless, these other factors' effect on the reception of the access probes 302 at the base station 102 can be substantial.

One particular parameter that may affect detection of an access probe 302 is the Rise-over-Thermal (RoT). RoT corresponds to a level of interference beyond that which would occur due to thermal noise. Here, a measured RoT may indicate how much interference the access probe 302 actually needs to overcome to be successfully detected at the base station 102. A conventional system may typically fix a typical Rise-over-Thermal (RoT, representing the interference level measured at the base station 102), and may accordingly set a target first access probe success probability. Simulations can then be run under different channels to determine what offset is needed, on top of forward link measured power. Based on this information, the access terminal 104 sets the initial transmit power level $A_0$.

For example, in cdma2000 systems, the first access probe transmit power $A_0$ is primarily determined by the access terminal 104 in accordance with a measured forward link received power. Further, there are certain parameters transmitted from the base station 102 to enable the access terminal 104 to fine tune transmit power for the access probes 302.

However, these parameters are common for all access terminals in the base station's coverage area, and cannot be changed quickly. Furthermore, there is no direct RoT-based mechanism in the design.

At certain times of day, such as during the night, the RoT or interference level can be consistently low. During these times, because interference level is usually low, the base station 102 may be capable of receiving an access probe 302 that the access terminal 104 transmits at a very low power. Thus, because a conventional access sequence generally does not take into account the current RoT when determining the access probe transmit power, during these times it is possible that access terminals 104 may consistently utilize access probe transmit powers that are greater than needed for successful reception at the base station 102.

In accordance with an aspect of the disclosure, access terminal 104 may utilize an RoT-based mechanism to adjust the transmit power of an access probe 302. In a further aspect of the disclosure, the implementation of the mechanism enabling RoT-based adjustments to the access probe transmit power may be backward compatible, enabling legacy access terminals to continue functioning in the network as normal. To this end, in an aspect of the disclosure, the base station 102 may transmit an information element in a forward link message (i.e., from the base station 102 to the access terminal 104) corresponding to the measured RoT.

In one example, the information element corresponding to the RoT may indicate a measured value of the RoT. In this way, the access terminal 102 can be enabled to determine an access probe transmission power as a function of the measured RoT. However, in this example, it would generally require a plurality of bits to convey accurate information about the value of the measured RoT, resulting in increased signaling overhead. Further, such a configuration may not be backwards compatible, as access terminals not configured to read this information element would not know how to deal with the information.

In another example, the information element corresponding to the RoT may be configured differently. For example, the information element may be a single bit (or flag). The bit can be adapted to indicate whether the RoT measured at the base station 102 is substantially lower than normal, i.e., not as high as access probes 302 are designed for. For example, this bit may be set if the RoT is less than a suitable threshold. And the bit may not be set if the RoT is above a suitable threshold. Thus, as one can see the information element can be a dynamic parameter as operating conditions change during communications.

In yet another example, the information element may correspond to a loading of the base station 102. The information element may be transmitted in a forward link message Also, the information element may indicate whether the loading, corresponding to the number of UEs in communication with the base station 102, or the amount of traffic through the base station 102, is above and/or lower than a suitable threshold. Here, the information element corresponding to the loading of the base station 102 may be any suitable number of bits, from one to a plurality of bits.

In a further aspect of the disclosure, the information element transmitted by the base station may correspond to either one or both of the interference and/or the loading at the base station 102. For example, a single bit may be transmitted, indicating that either one or both of the interference and/or the loading at the base station are low. In another example, two or more bits may be transmitted, such that information corresponding to both the interference and the loading at the base station 102 may be provided to the access terminal 104.

In this way, if the base station 102 indicates that it is reverse link underloaded, the access terminal 104 can modify operation. For example, the access terminal 104 may reduce its access probe transmit power without reducing the likelihood of success of the access attempt. On the other hand, if the base station 102 indicates that it is not reverse link underloaded, the access terminal 104 may utilize an access probe transmit power corresponding to normal RoT conditions.

In an aspect of the disclosure, the base station 102 may transmit the reverse link underload indicator in a short and continuously transmitted forward link message. As one example, this can be done using such as the general page message (GPM) utilized in cdma2000 1x technology, which the access terminal 104 already reads before starting access. That is, when Layer 3 (210) at the base station 104 transmits a protocol data unit (PDU) corresponding to the general page message (GPM) to Layer 2 (204), it may also send certain GPM common fields to Layer 2 (204). In accordance with an aspect of the disclosure, one of the GPM's common fields may be designated as a reverse link underload indicator field. In a further aspect of the disclosure, this reverse link underload indicator field may include a single bit of information. In this example, the base station 104 may set this field to '1' if the reverse link is underloaded; otherwise, it may set this field to '0.' That is, in an aspect of the disclosure, the default value of the reverse link underload indicator may be '0,' to indicate the base station 102 is operating normally. When the RoT measured at the base station 102 is low (such as during the night when no one is accessing the system), the base station can set this bit to '1.' The dynamic nature of modifying load characteristics enables dynamic power adjustments enabling efficient use of power resources.

In a further aspect of the disclosure, the criterion for setting the reverse link underload indicator bit may be based on a filtered RoT estimation. This determination may be done over a suitable window.

On the side of the access terminal 104, the reverse link underload indicator may be received from the base station 102. In some examples, this information may be received at the access terminal 104 periodically, such as when it is broadcasted over the cell in a general page message (GPM). Of course, within the scope of the disclosure, the reverse link underload indicator may be carried over the air on any suitable channel at any suitable timing, not necessarily being periodic or broadcasted over the whole cell. In any case, the access terminal 104 may accordingly store the received reverse link underload indicator in a memory.

When the access terminal 104 determines to access the system, e.g., to initiate a call and/or to respond to a page, it may at this time read this stored information from memory. If the reverse link underload indicator (in some embodiments being represented by a single bit has a value of '0,' indicating, for e.g., that the RoT is greater than or equal to a suitable threshold), then the access terminal 104 may send an access probe with normal power. If the bit has a value of '1,' the access terminal 104 knows that the base station 102 is lightly loaded (e.g., the RoT is below a corresponding threshold), so the access terminal 104 has the option to reduce its transmit power $A_0$ for the first access probe 302 by a suitable level. That is, in an aspect of the disclosure, the access terminal 104 may have the option to ignore the reverse link underload indicator, and utilize a conventional access probe transmit power even in the reverse link underload scenario.

In this way, the access terminal 104 configured according to aspects of the disclosure may have the option to behave in the same way as a conventional access terminal. Furthermore, a conventional access terminal may operate in the network configured according to aspects of the disclosure, by ignoring the reverse link underload indicator. To this end, in a further aspect of the disclosure enabling this backwards compatibility, the reverse link underload indicator may be included within the general page message (GPM), which according to existing standards includes some reserved bits, which are ignored by a conventional access terminal. Thus, one or more of these reserved bits may be allocated to the reverse link underload indicator.

In a further aspect of the disclosure, the determination of the initial access probe transmit power $A_0$ may correspond to a function of a plurality of variables including but not limited to the value of the reverse link underload indicator. For example, the access terminal 104 may utilize considerations of available headroom power, power amplifier state, size and type of data to transmit, etc., to determine the initial access probe transmit power $A_0$. Furthermore, the access terminal 104 may increase the access probe transmit power above the determined initial access probe transmit power $A_0$ by a suitable amount $\Delta$ during subsequent access probe transmissions in the access sequence, as described above and illustrated in FIG. 3.

Figure 4:
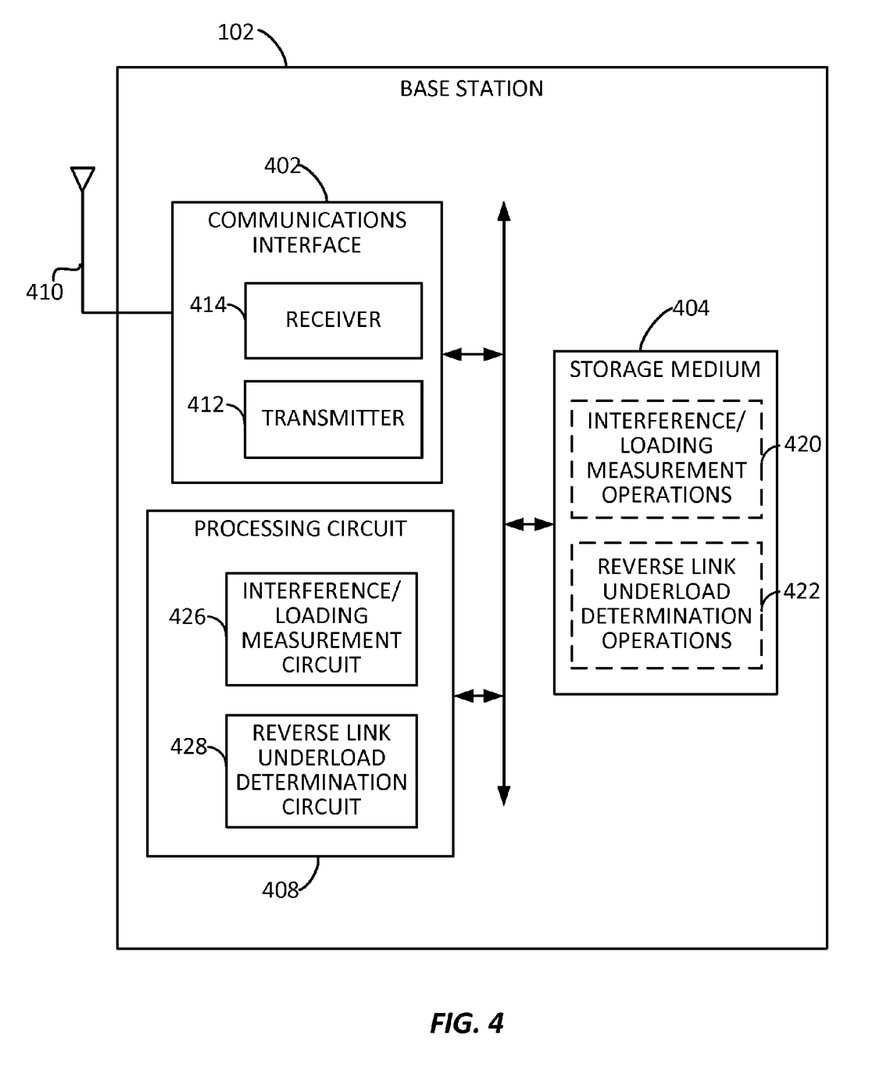
FIG. 4 is a block diagram illustrating select components of a base station according to some embodiments.

FIG. 4 is a block diagram illustrating select components of a base station 102 according to at least one aspect of the disclosure. The exemplary base station 102 as illustrated includes a communications interface 402 and a storage medium 404. These components can be coupled to and/or placed in electrical communications with a processing circuit 408.

The communications interface 402 may be adapted to facilitate wireless communications of the base station 102. For example, the communications interface 402 may include circuitry and/or programming adapted to facilitate the communication of information bi-directionally with respect to one or more communications devices in a network. The communications interface 402 may be coupled to one or more antennas 410 for wireless communications within a wireless communications system. The communications interface 402 can be configured with one or more standalone receivers and/or transmitters, as well as one or more transceivers. In the illustrated example, the communications interface 402 includes a transmitter 412 and a receiver 414.

The storage medium 404 may represent one or more computer-readable, machine-readable, and/or processor-readable devices for storing programming, such as processor executable code or instructions (e.g., software, firmware), electronic data, databases, or other digital information. The storage medium 404 may also be used for storing data that is manipulated by the processing circuit 408 when executing programming. The storage medium 404 may be any available medium that can be accessed by a general purpose or special purpose processor, including portable or fixed storage devices, optical storage devices, and various other mediums capable of storing, containing or carrying programming. By way of example and not limitation, the storage medium 404 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 404 may be coupled to the processing circuit 408 such that the processing circuit 408 can read information from, and write information to, the storage medium 404. That is, the storage medium 404 can be coupled to the processing circuit 408 so that the storage medium 404 is at least accessible by the processing circuit 408, including examples where at least one storage medium is integral to the processing circuit 408 and/or examples where at least one storage medium is separate from the processing circuit 408 (e.g., resident in the base station 102, external to the base station 102, or distributed across multiple entities).

Programming stored by the storage medium 404, when executed by the processing circuit 408, causes the processing circuit 408 to perform one or more of the various functions and/or process steps described herein. For example, the storage medium 404 may include interference and/or loading measurement operations 420 and reverse link underload determination operations 422, each adapted for regulating operations at one or more hardware blocks of the processing circuit 408, and/or regulating a sequence of operations when utilizing the communications interface 402, as described in further detail below. The interference and/or loading measurement operations 420 and reverse link underload determination operations 422 may include programming implemented at layers 1, 2, and/or 3 of the protocol stack architecture depicted in FIG. 2, adapted for enabling measurement of interference and/or loading at the base station 102 (e.g., determination of the RoT), and in some examples, determination of an underload condition at the reverse link, corresponding to the measured interference and/or loading being below a given threshold level.

The processing circuit 408 is generally adapted for processing, including the execution of such programming stored on the storage medium 404. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 408 is arranged to obtain, process and/or send data, control data access and storage, issue commands, and control other desired operations. The processing circuit 408 may include circuitry configured to implement desired programming provided by appropriate media in at least one example. For example, the processing circuit 408 may be implemented as one or more processors, one or more controllers, and/or other structure configured to execute executable programming. Examples of the processing circuit 408 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 408 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 408 are for illustration and other suitable configurations within the scope of the present disclosure are also contemplated.

According to one or more aspects of the present disclosure, the processing circuit 408 may be adapted to perform any or all of the features, processes, functions, steps and/or routines for any or all of the base stations 102 described herein. As used herein, the term "adapted" in relation to the processing circuit 408 may refer to the processing circuit 408 being one or more of configured, employed, implemented, and/or programmed to perform a particular process, function, step and/or routine according to various features described herein.

According to at least one example of the base station 102, the processing circuit 408 may include interference/loading measurement circuitry 426 adapted for determining, for example, a rise-over-thermal (RoT) corresponding to interference at the base station 102, e.g., in coordination with the receiver 414. In another example, the interference/loading measurement circuitry 426 may determine an instantaneous or average loading of the base station 102 corresponding to one or more access terminals 104 communicating with the base station 102. The interference/loading measurement circuitry 426 may operate independently of, or may utilize programming stored on, one or more components of the storage medium 404. In a further aspect of the disclosure, the processing circuit 408 may include reverse link underload determination circuitry 428 adapted for determining the existence of an underload condition of the reverse link, as described in further detail below.

Figure 5:
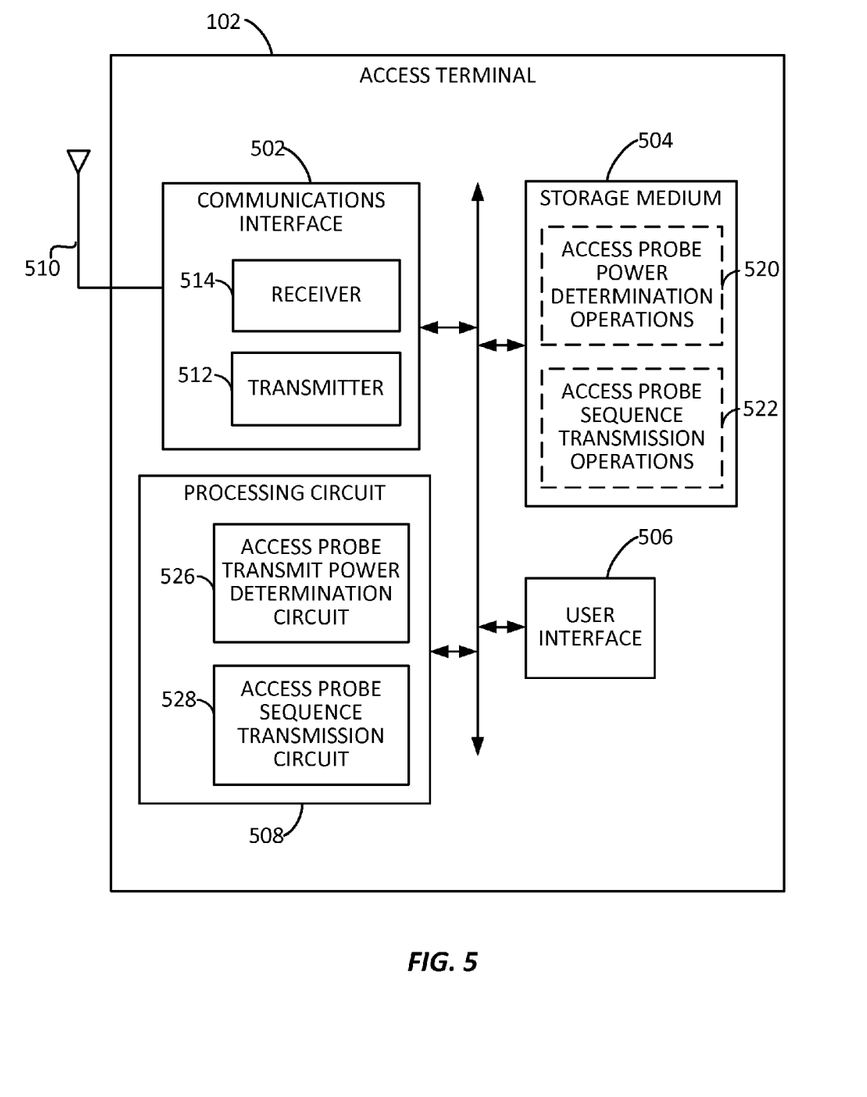
FIG. 5 is a block diagram illustrating select components of an access terminal according to some embodiments.

FIG. 5 is a block diagram illustrating select components of an access terminal 104 according to at least one aspect of the disclosure. The exemplary access terminal 104 as illustrated includes a communications interface 502, a storage medium 504, and a user interface 506. These components can be coupled to and/or placed in electrical communications with a processing circuit 508.

The user interface 506 may include one or more circuits, modules, or components for enabling a user of the access terminal 102 to use and/or control the access terminal 102, including but not limited to a display, a keyboard, a touchscreen, speaker, microphone, etc.

Here, the communications interface 502, the storage medium 504, and the processing circuit 508 may be largely the same as the communications interface 402, the storage medium 404, and the processing circuit 408 described above in relation to the base station 102 illustrated in FIG. 4. However, as described herein below, the processing circuit 508 may include one or more different functional blocks and the storage medium 504 may include one or more different functional software blocks.

Programming stored by the storage medium 504, when executed by the processing circuit 508, causes the processing circuit 508 to perform one or more of the various functions and/or process steps described herein. For example, the storage medium 504 may include access probe transmit power determination operations 520 and access probe sequence transmission operations 522, each adapted for regulating operations at one or more hardware blocks of the processing circuit 508, and/or regulating a sequence of operations when utilizing the communications interface 502, as described in further detail below. The access probe transmit power determination operations 520 and access probe sequence transmission operations 522 may include programming implemented at layers 1, 2, and/or 3 of the protocol stack architecture depicted in FIG. 2, adapted for enabling determination of the power of an access probe transmission, e.g., in accordance with a received reverse link underload indicator.

The processing circuit 508 may include access probe transmit power determination circuitry 526. The circuitry 526 can be configured for determining, for example, the initial access probe transmit power $A_0$ in accordance with one or more factors including, but not limited to, a received reverse link underload indicator. The access probe transmit power determination circuitry 526 may operate independently of, or may utilize programming stored on, one or more components of the storage medium 504. Further, the access probe transmit power determination circuitry 526 may operate to control a power of the transmitter 512 when transmitting at least an initial access probe during an access sequence, and in some examples, the power of all access probes during an access sequence. In a further aspect of the disclosure, the processing circuit 508 may include an access probe sequence transmission circuit 528 adapted to utilize the transmitter 512 to transmit the access sequence as described above and illustrated in FIG. 3.

Figure 6:
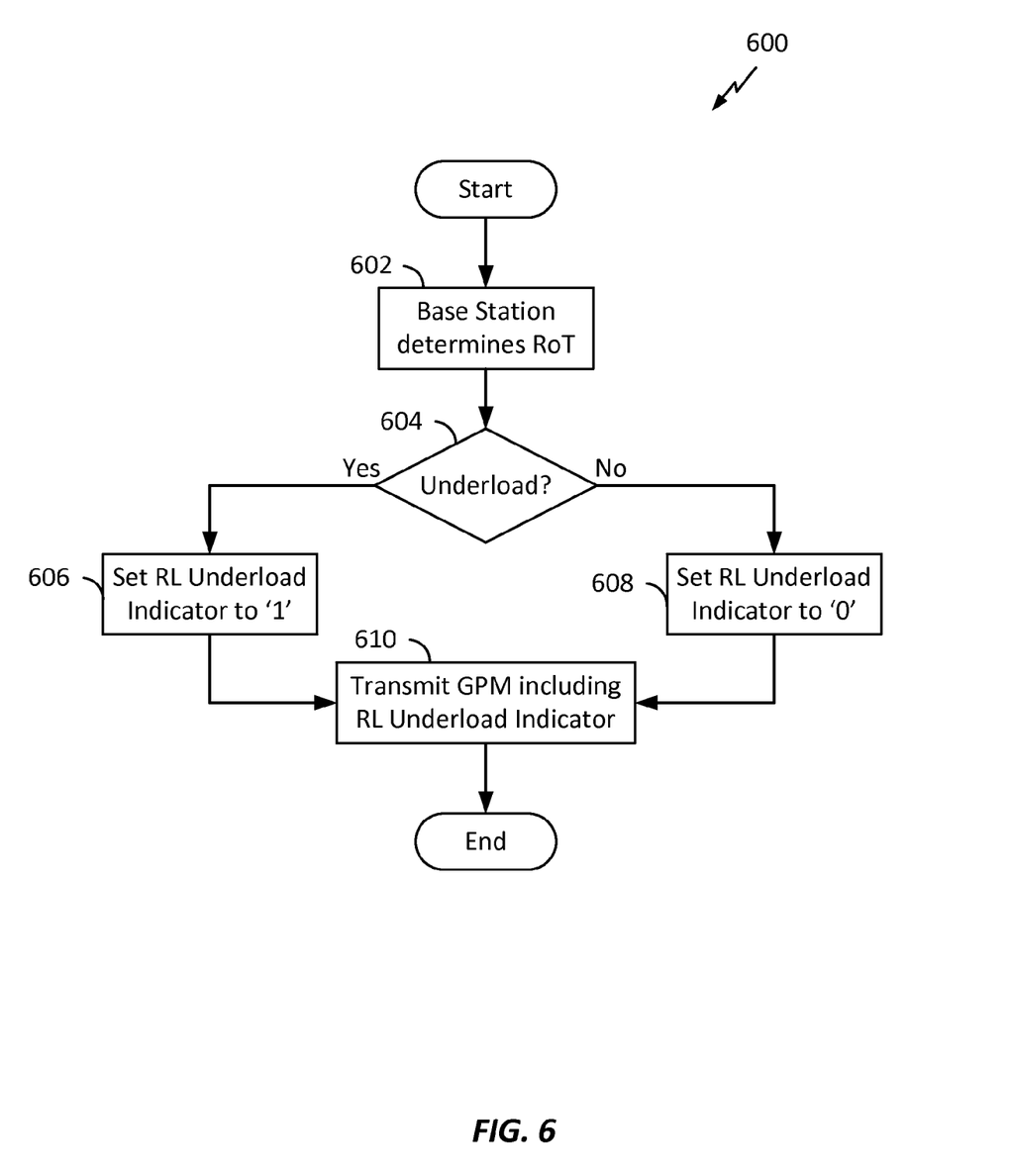
FIG. 6 is a flow chart illustrating a process of transmitting a reverse link underload indicator according to some embodiments.

FIG. 6 is a flow chart illustrating an exemplary process 600 operable at a base station (e.g., at the base station 102) for indicating a reverse link underload condition in accordance with one or more aspects of the disclosure.

At step 602, the base station 102 may determine one or more of an interference and/or loading condition. In one example, the base station 102 may utilize the receiver 414 to measure a RoT in the cell. Here, the RoT may correspond to an instantaneous value at the time of the determination, or in another example, the RoT may be a filtered or averaged value determined over a suitable window utilizing any suitable filtering or averaging algorithm. At step 604, based on this determination, the base station 102 may determine whether a reverse link underload condition exists. For example, a reverse link underload condition may exist if the determined RoT is above an RoT threshold (e.g., a predetermined RoT threshold). In another example, a reverse link underload condition may exist if a loading of the cell is less than a loading threshold (e.g., a predetermined loading threshold).

If an underload condition exists, then the process 600 may proceed to step 606. At 606, the base station 102 may set a reverse link underload indicator to a value of '1.' Of course, the value of '1' is merely exemplary in nature, and of course implies that the reverse link underload indicator includes only a single bit of information. In other examples within the scope of the disclosure, the reverse link underload indicator may include any suitable number of bits, and in an example consisting of only one bit, the value of '1' indicating the existence of the underload condition is merely one example. In this example, returning to step 604, if the base station 102 determines that the reverse link underload condition does not exist, then the process may proceed to step 608, wherein the base station 102 may set the reverse link underload indicator to a value of '0.' Other values may also be utilized as desired.

At step 610, the base station 102 may transmit the reverse link underload indicator, e.g., utilizing the transmitter 412. In one example, the reverse link underload indicator may appear as an information element carried on a general page message (GPM), which may be continuously, periodically, or intermittently broadcasted over the cell corresponding to the base station 102. Once the reverse link underload indicator is transmitted, the process 600 may repeat as needed to keep access terminals in the proximity of the base station 102 apprised of existing reverse link underload conditions.

Figure 7:
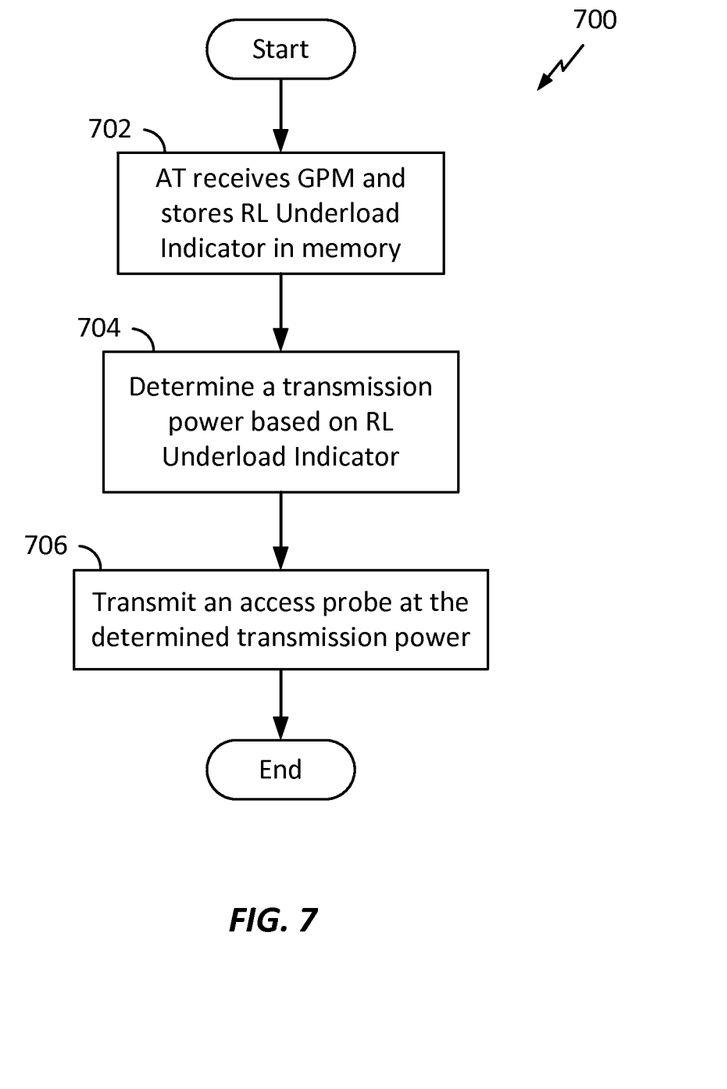
FIG. 7 is a flow chart illustrating a process of controlling an access probe transmit power in accordance with a reverse link underload indicator according to some embodiments.

FIG. 7 is a flow chart illustrating an exemplary process 700 operable at an access terminal (e.g., the access terminal 104) for transmitting an access probe sequence in accordance with one or more aspects of the disclosure.

At step 702, the access terminal 104 may receive the reverse link underload indicator transmitted by the base station 102. In one example, the reverse link underload indicator may be contained in a general page message (GPM) broadcasted by the base station 102. Here, the access terminal 104 may store the received reverse link underload indicator in memory, (e.g., at the storage medium 504).

At step 704, when the access terminal 104 determines to initiate an access attempt and/or to respond to a received page, the access terminal 104 may determine a transmission power for the transmission of an access probe 302, based at least in part on the received reverse link underload indicator. As described above, in accordance with an aspect of the disclosure, if the reverse link underload indicator has a value of '1,' indicating a reverse link underload condition, the power $A_0$ of an initial access probe transmission may be reduced, as the reverse link underload condition may accommodate the reliable reception of an access probe 302 at a reduced power.

In some examples, the change in the power of the access probe transmission according to the received reverse link underload indicator may be optional, at the option of the access terminal 104. That is, in some aspects of the disclosure, although the base station 102 may indicate the existence of the reverse link underload condition, the decision whether to alter the access sequence in accordance with this condition may be made at the access terminal 104 itself.

At step 706, the access terminal 104 may transmit one or more access probes 302, e.g., utilizing the determined transmission power for an initial access probe transmission, and in some examples, incrementally increasing the access probe transmission power during sequential access probe transmissions until a response is received from the base station 102 indicating successful reception at the base station 102 of the access probe.

By utilizing a reduced access probe transmission power as described above, the access terminal 104 can be enabled to achieve lower power consumption, potentially extending battery life. Furthermore, the access terminal 104 can be enabled to reduce the interference caused by the access probe transmission, which can affect both the base station 102 to which the access probe is being transmitted, as well as neighboring base stations in the network.

While the above discussed aspects, arrangements, and embodiments are discussed with specific details and particularity, one or more of the components, steps, features and/or functions illustrated in FIGS. 1, 2, 4, and/or 5 may be rearranged and/or combined into a single component, step, feature or function or embodied in several components, steps, or functions. Additional elements, components, steps, and/or functions may also be added or not utilized without departing from the invention. The apparatus, devices and/or components illustrated in FIGS. 1, 2, 4, and/or 5 may be configured to perform or employ one or more of the methods, features, parameters, or steps described in FIGS. 6 and/or 7. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

The invention claimed is:

1. A method of wireless communication operable at a base station, comprising:
   determining whether a rise-over-thermal (RoT) corresponding to interference at the base station is less than a predetermined threshold; and
   transmitting an information element corresponding to the determined RoT,
   wherein the information element comprises one reserved bit of a general page message (GPM) broadcasted by the base station, and
   wherein the information element is configured to indicate whether the RoT is less than the predetermined threshold.

2. The method of claim 1, wherein the determining whether the RoT is less than the predetermined threshold comprises determining a filtered RoT value over a predetermined window of time.

3. A method of wireless communication operable at an access terminal, comprising:
   receiving a one-bit indication of at least one of interference or loading at a base station, wherein the one-bit indication comprises one reserved bit of a general page message (GPM) received from the base station;
   reducing a transmit power of an initial access probe based at least in part on the received one-bit indication; and
   transmitting the initial access probe.

4. The method of claim 3, wherein the one-bit indication is configured to indicate whether a rise-over-thermal (RoT) corresponding to interference at the base station is less than a predetermined threshold.

5. The method of claim 4, wherein the reducing the transmit power of the initial access probe comprises reducing the transmit power of the initial access probe when the one-bit indication indicates that the RoT is less than the predetermined threshold.

6. A base station configured for wireless communication, comprising:
means for determining whether a rise-over-thermal (RoT) corresponding to interference at the base station is less than a predetermined threshold; and
means for transmitting an information element corresponding to the determined RoT,
wherein the information element comprises one reserved bit of a general page message (GPM) broadcasted by the base station, and
wherein the information element is configured to indicate whether the RoT is less than the predetermined threshold.

7. The base station of claim 6, wherein the means for determining whether the RoT is less than the predetermined threshold is further configured to determine a filtered RoT value over a predetermined window of time.

8. An access terminal configured for wireless communication, comprising:
means for receiving a one-bit indication of at least one of interference or loading at a base station, wherein the one-bit indication comprises one reserved bit of a general page message (GPM) received from the base station;
means for reducing a transmit power of an initial access probe based at least in part on the received one-bit indication; and
means for transmitting the initial access probe.

9. The access terminal of claim 8, wherein the one-bit indication is configured to indicate whether a rise-over-thermal (RoT) corresponding to interference at the base station is less than a predetermined threshold.

10. The access terminal of claim 9, wherein the means for reducing the transmit power of the initial access probe is further configured to reduce the transmit power of the initial access probe when the indication indicates that the RoT is less than the predetermined threshold.

11. A base station configured for wireless communication, comprising:
at least one processor;
a communications interface communicatively coupled to the at least one processor; and
a memory communicatively coupled to the at least one processor,
wherein the at least one processor is configured to:
determine whether a rise-over-thermal (RoT) corresponding to interference at the base station is less than a predetermined threshold; and
transmit an information element corresponding to the determined RoT,
wherein the information element comprises one reserved bit of a general page message (GPM) broadcasted by the base station, and
wherein the information element is configured to indicate whether the RoT is less than the predetermined threshold.

12. The base station of claim 11, wherein the at least one processor, being configured to determine whether the RoT is less than the predetermined threshold, is further configured to determine a filtered RoT value over a predetermined window of time.

13. An access terminal configured for wireless communication, comprising:
at least one processor;
a communications interface communicatively coupled to the at least one processor; and
a memory communicatively coupled to the at least one processor,
wherein the at least one processor is configured to:
receive a one-bit indication of at least one of interference or loading at a base station, wherein the one-bit indication comprises one reserved bit of a general page message (GPM) received from the base station;
reduce a transmit power of an initial access probe based at least in part on the received one-bit indication; and
transmit the initial access probe.

14. The access terminal of claim 13, wherein the one-bit indication is configured to indicate whether a rise-over-thermal (RoT) corresponding to interference at the base station is less than a predetermined threshold.

15. The access terminal of claim 14, wherein the at least one processor, being configured to reduce the transmit power of the initial access probe, is further configured to reduce the transmit power of the initial access probe when the one-bit indication indicates that the RoT is less than the predetermined threshold.

16. A non-transitory computer-readable storage medium comprising instructions that, when executed by a computer operable at a base station, cause the computer to:
determine whether a rise-over-thermal (RoT) corresponding to interference at the base station is less than a predetermined threshold; and
transmit an information element corresponding to the determined RoT,
wherein the information element comprises one reserved bit of a general page message (GPM) broadcasted by the base station, and
wherein the information element is configured to indicate whether the RoT is less than the predetermined threshold.

17. The non-transitory computer-readable storage medium of claim 16, wherein the instructions for determining whether the RoT is less than the predetermined threshold are further configured for determining a filtered RoT value over a predetermined window of time.

18. A non-transitory computer-readable storage medium comprising instructions that, when executed by a computer operable at an access terminal, cause the computer to:
receive a one-bit indication of at least one of interference or loading at a base station, wherein the one-bit indication comprises one reserved bit of a general page message (GPM) broadcasted by the base station;
reduce a transmit power of an initial access probe based at least in part on the received one-bit indication; and
transmit the initial access probe.

19. The non-transitory computer-readable storage medium of claim 18, wherein the one-bit indication is configured to indicate whether a rise-over-thermal (RoT) corresponding to interference at the base station is less than a predetermined threshold.

20. The non-transitory computer-readable storage medium of claim 19, wherein the instructions for reducing the transmit power of the initial access probe are further configured for reducing the transmit power of the initial access probe when the one-bit indication indicates that the RoT is less than the predetermined threshold.

* * * * *